John P.K. Fontaine
Noah M. Norman
INVENTORS

Patented Apr. 3, 1945

2,372,943

UNITED STATES PATENT OFFICE 2,372,943

TRAILER COUPLING MECHANISM

John P. K. Fontaine and Noah M. Norman, Birmingham, Ala.; said Norman assignor to said Fontaine Application October 30, 1944, Serial No. 560,965

7 Claims. (Cl. 280—33.1)

This invention relates to a fifth wheel, or coupling mechanism, for coupling an automotive tractor to a trailer, particularly of the type embodying a pair of pivoted locking jaws which open to receive the king pin on a trailer and are so positioned that when coupled the pulling force exerted by the king pin acts to hold the locking jaws in closed position, and has for an object the provision of improved means for opening the locking jaws to uncouple the trailer from the tractor.

A further object of our invention is to provide, in apparatus of the character designated, operating means for the locking jaws whereby they may be opened manually by means of a lever accessible from the side of the apparatus, or may be opened by means of air pressure from a point remote from the apparatus.

In our application Serial No. 544,483, filed July 12, 1944, we have shown, described and claimed. operating means for the mechanism of a fifth wheel assembly which includes a latch adapted to hold the locking jaws partially open when uncoupling the trailer from the tractor and which latch is released responsive to uncoupling the trailer from its tractor. Our present application contemplates the use of a similar latch, but provides a more simplified operating arrangement for the locking jaws together with means for operating the locking jaws pneumatically.

Apparatus embodying features of our invention is illustrated in the accompanying drawing, forming a part of this application, in which Fig. 1 is a side elevation showing the apparatus mounted on a tractor and in position to engage the king pin of a trailer;

Figure 1:
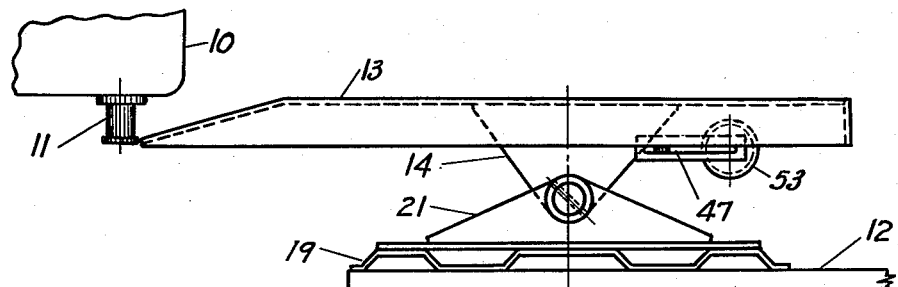

Referring now to the drawing for a better understanding of our invention, we show in Fig. 1, a fragment of a trailer 10 having a king pin 11. At 12 is shown a fragment of a tractor vehicle to which our improved coupling mechanism is applied. Our improved coupling mechanism comprises a fifth wheel plate 13 having secured to the under side thereof lateral brackets 14 and 16 carrying bearings 17 and 18. A supporting base 19 on the tractor 12 has mounting brackets 21 and 22 mounted thereon which mounting brackets carry bearings 23 and 24. A rocker shaft 26 extends through the bearings 23 and 24, and 17 and 18 to mount the assembly pivotally on the rear of the tractor 12.

Figure 2:
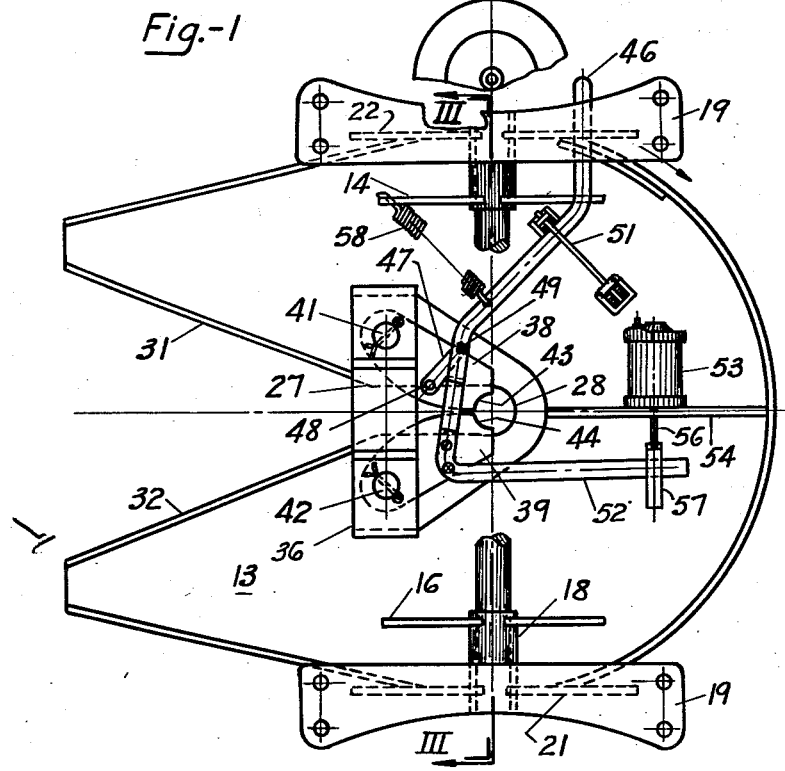
Fig. 2 is a bottom plan view of the apparatus.
Figure 3:
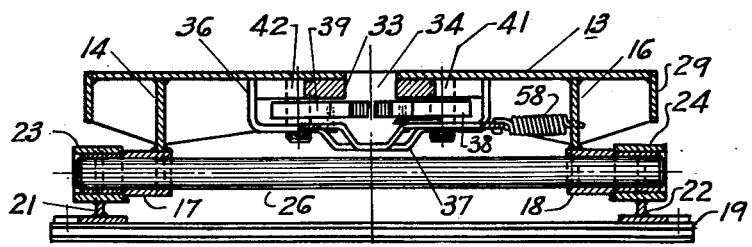
Fig. 3 is a sectional view taken along the lines III—III of Fig. 2.

The plate 13 is provided with an elongated flaring opening 27 which extends from the rear forwardly and is rounded internally of the plate as shown at 28. Extending around the outer periphery of the plate 13 is a reinforcing flange 29, and the sides of the opening 27 are reinforced by means of flanges 31 and 32. Internally of the plate 13 and around the rounded portion of the opening 27 is a relatively heavy reinforcing block 33 which is welded or otherwise suitably secured to the plate 13. As will be seen from Figs. 2 and 3, the reinforcing block 33 is provided with an opening 34 corresponding to the rounded opening 28 of the plate 13. A strap 36 extends transversely across the plate below the reinforcing block 33, spanning the opening 34, and is provided with a downward bend 37 to clear the king pin 11 when coupling to the trailer. The strap 36 is preferably welded both to the plate 13 and to the sides of the reinforcing block 33.

At 38 and 39 are shown locking jaws which are pivotally mounted on opposite sides of the opening 27 by means of pins 41 and 42 which extend downwardly through the sides of the reinforcing block 33 and through the strap 36, thus mounting the locking jaws between the strap 36 and the block 33. The locking jaws, as shown, extend forwardly from their pivot points and terminate beneath the rounded opening 28. The forward ends of the locking jaws 38 and 39 are provided with rounded bearing surfaces 43 and 44, respectively, against which the king pin 11 bears when the trailer 10 is being hauled. It will be noted that the pivot pins 41 and 42 are located substantially in the longitudinal axes of the locking jaws and that the rounded surfaces 43 and 44 are located inwardly of said longitudinal axes, whereby pressure by the king pin against the rounded surfaces 42 and 44 serves to draw the locking jaws closer together.

The locking jaws 38 and 39 are swung to open position to uncouple the trailer 10 from the tractor 12 by means of a lever 46 which extends outwardly through a slot 47 on the side of the plate 13 and which is secured, inwardly of the fifth wheel, to the locking jaw 39. By this means, when the lever 46 is swung in the direction shown by the arrow, the locking jaw 39 is moved toward open position. At 47 is shown a link which is pivotally connected at 48 to the locking jaws 38 and which is pivotally connected to the lever 46 at 49. It will be seen, by this means, when the lever 46 is moved to open the locking jaw 39, the link 47 will also pull the locking jaw 38 in the opposite direction toward open position.

At 51, we show a latch such as is described in our aforesaid application Serial No. 544,483, and which is not specifically claimed in this application. The latch 51 is adapted to engage the lever 46 at an intermediate position to hold the locking jaws 38 and 39 partially open when uncoupling the trailer from the tractor.

At 52 we show a forwardly extending arm forming a part of the lever 46. A pneumatic cylinder 53 is mounted on the underside of the plate 13 on a longitudinally extending strip 54 and has its piston rod 56 extending outwardly toward the arm 52. A yoke 57 on the piston rod 56 embraces the arm 52 so that when the piston rod 56 moves outwardly, it moves the lever 46 in the direction shown by the arrow and the locking jaws 38 and 39 to open position. Thus, where air pressure is available on the tractor, it may be conveyed to the cylinder 53 by any suitable means, not shown, to open locking jaws 38 and 39 and uncouple the trailer from the tractor. A spring 58 connects the lever 46 to the bracket 14 and serves to bias the lever and the locking jaws toward closed position as viewed in Fig. 2 of the drawing.

From the foregoing it will be apparent that we have devised an improved trailer coupler mechanism which is simple and sturdy of design and operation, and in which the locking dogs may be positively and readily moved to open position both manually and pneumatically and returned to closed position upon release of the opening force.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are specifically set forth in the appended claims.

What we claim is:

1. In a trailer coupling mechanism embodying a pair of pivoted locking dogs adapted to swing apart when uncoupling the trailer, a manually operable lever rigidly secured to one dog and disposed to swing said dog to open position, and a link connecting the lever to the other dog and disposed to move said dog in a direction opposite to the first mentioned dog.

2. In a trailer coupling mechanism embodying a pair of pivoted locking dogs adapted to swing apart when uncoupling the trailer, a manually operable lever rigidly secured to one dog and disposed to swing said dog to open position, a link connecting the lever to the other dog and disposed to move said dog in a direction opposite to the first mentioned dog, a spring for moving the lever in a direction to close the dogs, and a pneumatic cylinder operatively connected to the lever.

3. In a trailer coupling mechanism embodying a pair of pivoted locking dogs adapted to swing apart when uncoupling the trailer, a manually operable lever rigidly secured to one dog and disposed to swing said dog to open position, a link connecting the lever to the other dog and disposed to move said dog in a direction opposite to the first mentioned dog, a pneumatic cylinder mounted on the mechanism and having a piston operatively connected to the lever to move the dogs to open position, and a spring for biasing the lever toward closed position.

4. In a trailer coupling mechanism embodying a pair of pivoted locking dogs adapted to swing apart when uncoupling the trailer, a manually operable lever rigidly secured to one dog and disposed to swing said dog to open position, a link connecting the lever to the other dog and disposed to move said dog in a direction opposite to the first mentioned dog, an arm on the lever, a pneumtaic cylinder fixedly mounted on the mechanism adjacent the arm and having a piston rod extending outwardly toward the arm, and a yoke on the piston rod embracing the lever.

5. In apparatus of the character described, a pair of locking dogs pivotally mounted to swing toward each other to close and to swing apart to open, a manually operable lever rigidly secured to one of the dogs, a link connecting the lever to the other dog and disposed to move said other dog responsive to movement of the lever in a direction opposite the direction of movement of the first mentioned dog, and a spring for biasing the lever in a direction to move the dogs toward closed position.

6. In apparatus of the character described, a pair of locking dogs pivotally mounted to swing toward each other to close and to swing apart to open, a manually operable lever rigidly secured to one of the dogs, a link connecting the lever to the other dog and disposed to move said other dog responsive to movement of the lever in a direction opposite the direction of movement of the first mentioned dog, a spring for biasing the lever in a direction to move the dogs toward closed poistion, and a pneumatic cylinder having a piston operatively connected to the lever and disposed to move the lever in a direction to swing the dogs apart.

7. In a trailer coupling mechanism embodying a pair of pivoted locking dogs adapted to swing apart when uncoupling the trailer, a bell crank lever rigidly secured at an intermediate point to one of the locking dogs and having one arm extending radially outward of the fifth wheel for manual operation, a pneumatic cylinder having a movable element disposed to actuate the other arm of the lever, and a link connecting the lever to the other locking dog and adapted to swing the other locking dog in a direction opposite that of the first mentioned locking dog.

JOHN P. K. FONTAINE.
NOAH M. NORMAN.